(12) United States Patent
Chen et al.

(10) Patent No.: US 7,793,161 B2
(45) Date of Patent: Sep. 7, 2010

(54) METHOD AND APPARATUS TO ANTICIPATE MEMORY EXHAUSTION IN AN OPEN SERVICES GATEWAY INITIATIVE ENVIRONMENT

(75) Inventors: Jinfang Chen, Austin, TX (US); Nitin Gaur, Round Rock, TX (US); Gautham Pamu, Round Rock, TX (US); Benjamin S. Vera-Tudela, Austin, TX (US); Zhennan Wang, Austin, TX (US); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 11/754,579

(22) Filed: May 29, 2007

(65) Prior Publication Data

US 2008/0301504 A1 Dec. 4, 2008

(51) Int. Cl.
*G06F 11/00* (2006.01)
(52) U.S. Cl. ...................................................... 714/47
(58) Field of Classification Search ..................... 714/2, 714/3, 5, 8, 15, 16, 20, 21, 37–39, 42, 47, 714/50, 57
See application file for complete search history.

(56) References Cited

U.S. PATENT DOCUMENTS

| 5,566,315 | A | 10/1996 | Milillo et al. |
| 5,689,707 | A * | 11/1997 | Donnelly ..................... 707/206 |
| 6,351,845 | B1 * | 2/2002 | Hinker et al. ................ 717/128 |
| 7,234,080 | B2 * | 6/2007 | Cirne et al. .................... 714/38 |
| 7,257,692 | B2 * | 8/2007 | Schumacher ................ 711/170 |
| 7,293,142 | B1 * | 11/2007 | Xu et al. ...................... 711/124 |
| 7,293,263 | B2 * | 11/2007 | Dahlstedt et al. ............ 717/154 |
| 7,313,661 | B1 * | 12/2007 | Dmitriev ..................... 711/159 |
| 7,454,661 | B2 * | 11/2008 | Yu ................................ 714/38 |
| 2004/0078540 | A1 * | 4/2004 | Cirne et al. .................. 711/170 |
| 2005/0235127 | A1 * | 10/2005 | Muthiah et al. ............. 711/170 |
| 2006/0136530 | A1 * | 6/2006 | Rossmann ................... 707/206 |
| 2007/0033365 | A1 * | 2/2007 | Vaidyanathan et al. ...... 711/170 |
| 2008/0294936 | A1 * | 11/2008 | Hogstrom et al. .............. 714/8 |

* cited by examiner

*Primary Examiner*—Nadeem Iqbal
(74) *Attorney, Agent, or Firm*—Yee & Associates, P.C.; David A. Mims, Jr.

(57) ABSTRACT

A computer implemented method, computer program product, and data processing system for predicting a future status of a memory leak. A first set of data including memory consumption data is received at a software bundle. The software bundle is operating in an open services gateway initiative environment. Responsive to a determination that a memory leak exists, the first set of data is analyzed to predict a future status of the memory leak. The future status is stored, as stored data, in a storage device.

20 Claims, 13 Drawing Sheets

```
                    ( 09:50:06 CDT, 6.87428 MB) ,
                    ( 09:50:16 CDT, 6.909848 MB) ,        500
                    ( 09:50:26 CDT, 6.923144 MB) ,
            }
Running the algorithm
The slope is      -505.21396484375
Memory Threshold  1073.176576 MB
Current Memory    298.808616 MB
Calculated Time Left in mins Infinity (slope is negative)
Completed running the algorithm
*****************

Collecting Memory Data
Free Memory          75.729648 MB
Current Used Memory  997.748496 MB
Total Memory         1073.478144 MB
Current Memory    {
                    ( 09:49:16 CDT, 6.921336 MB) ,
                    ( 09:49:26 CDT, 705.854728 MB) ,
                    ( 09:49:36 CDT, 6.791672 MB) ,
                    ( 09:49:46 CDT, 6.816112 MB) ,
                    ( 09:49:56 CDT, 6.842768 MB) ,
                    ( 09:50:06 CDT, 6.87428 MB) ,
                    ( 09:50:16 CDT, 6.909848 MB) ,
                    ( 09:50:26 CDT, 6.923144 MB) ,
                    ( 09:50:36 CDT, 298.808616 MB) ,
            }
Running the algorithm
The slope is      2944.3228352864585
Memory Threshold  1073.176576 MB
Current Memory    997.748496 MB
Calculated Time Left in mins 0.42696903056976016
Completed running the algorithm
*****************

Action Taken (Time left in min) 0.42696903056976016 < Threshold Time 5.0  ~ 502
*****************

JVMDG217: Dump Handler is Processing OutOfMemory - Please Wait.
JVMDG315: JVM Requesting Heap dump file
JVMDG318: Heap dump file written to C:\eclipse\eclipse\heapdump.20050915.095047.3796.phd
JVMDG303: JVM Requesting Java core file
JVMDG304: Java core file written to C:\eclipse\eclipse\javacore.20050915.095047.3796.txt
JVMDG274: Dump Handler has Processed OutOfMemory.
java.lang.OutOfMemoryError
```

*FIG. 5*

Maxheap 1073176576
\> log Starting the Linear Regression Service
< log Launched the Linear Regression Service
Config ExhaustTimeThreshold 300000.0 Mindatapoints 4 MaxdatapointsCached 10
MemoryUsageThreshold 1073176576 SampleInterval 10000
*****************

Collecting Memory Data
Free Memory         3.25084 MB
Current Used Memory  11.295592 MB
Total Memory       14.547456 MB
Current Memory    {
                  }
Starting the Validator Bundle 0
osgi> Unable to find config.properties in classpath so place file in c drive
*****************

Collecting Memory Data
Free Memory         46.60704 MB
Current Used Memory  621.004592 MB
Total Memory       667.613696 MB
Current Memory    {
                  ( 14:18:28 CDT, 11.295592 MB) ,
                }
JVMDG217: Dump Handler is Processing OutOfMemory - Please Wait.
JVMDG315: JVM Requesting Heap dump file
JVMDG318: Heap dump file written to C:\eclipse\eclipse\heapdump.20050915.141845.5144.phd
JVMDG303: JVM Requesting Java core file
JVMDG304: Java core file written to C:\eclipse\eclipse\javacore.20050915.141845.5144.txt
JVMDG274: Dump Handler has Processed OutOfMemory.
java.lang.OutOfMemoryError:
        at com.ibm.ws.memory.MemoryConsumer.<init>(MemoryConsumer.java:19)
        at com.ibm.ws.memory.MemoryLeak.start (MemoryLeak.java:43)

*FIG. 7*

```
MLRConfig {
        // these are all user configurable
        Integer maxDataPointsCached = INFINITY;
        Integer minDataPointsToStart = 10;
        Integer samplingInterval = 10 seconds;
        Integer memoryUsageThreshold = 250 * MB;
        Integer exhaustTimeThreshold = 60 minutes;
        Callback actionToTake = stopServicing;
} private Thread thead = null;
private Vector memUsageDataPoints = new Vector {};

public void start() {
        // launch in a separate thread
        thread = new Thread();
        thread.run(new MEMORY PREDICTORConfig());
} public void stop() {
        thread.stop();
} private void run(MEMORY PREDICTORConfig config) {
        for (Integer i = 0; !thread.stopped(); i++)
        {
                // wait until next time interval
                sleep(config.samplingInterval * 1000);

// if too many entries cached, remove oldest entry
                if (config.maxDataPointsCached)
                    config.memUsageDataPoints.remove(0);

// append latest sample into the list
                config.memUsageDataPoints.append(System.getMemoryUsage());

// if minimum data points required exist then forecast
                if (config.memUsageDataPoints.size() >=
                config.minDataPointsToStart())
                {
                   Integer timeToExhaust = forecast(memUsageDataPoints,
                       config.memoryUsageThreshold,
                       config.samplingInterval);
```

FROM FIG. 13A

```
            // if time to exhaust is le the threshold, take action
            if (timeToExhaust <= config.exhaustTimeThreshold)
                    config.actionToTake();
            }
      }
}
Integer forecast(Vector memUsageDataPoints, Integer maximum, Integer interval)
{
        Line line1 = null;
        // this is a horizontal line with y=maximum (maximum memory)
        Line line2 = new Line(new Point(0, maximum),
                new Point(1, maximum));
        Integer timeIndex = 0;

// here is where the linear regression algorithm comes into play;
        // for each data point collected, the algorithm is used to estimate
        // the line that represents memory consumption growth rate (line1)
        foreach (y in memUsageDataPoints)
        {
                Point p = new Point(timeIndex, y);
                timeIndex += interval;

// line1 = Use LR to calculate "line1" using each Point p
        }

// once line1 has been estimated, we must find the point at which
        // line1 and line2 intercept, and the x-coordinate of this point
        // will represent the time it will take to run out of memory
        Point p = l1.intercept(l2);

return p.x;
}
```

*FIG. 13B*

```
import java.io.PrintStream;
import java.util.Vector;

// Referenced classes of package com.ibm.ws.memory:
//        ConfigReading, MemoryConsumer public class MemoryLeak
{ public MemoryLeak()
   {
   } public void start()
   {
      ConfigReading cr = new ConfigReading();
      int MAX_CONSUMERS = Integer.parseInt(cr.getMax_consumers().trim());
      int SLEEP_BETWEEN_ALLOCS = Integer.parseInt(cr.getSleep_between_allocs().trim());
      int MEMORY_BLOCK_SIZE = Integer.parseInt(cr.getMemory_block_size().trim());
      String LOG_OUTPUT = cr.getLog_output().trim();
      for(objectHolder = new Vector(); objectHolder.size() < MAX_CONSUMERS;)
      {
         if(LOG_OUTPUT.equalsIgnoreCase("on"))
         {
            System.out.println("Validator: Allocating object: " + Integer.toString(objectHolder.size()));
            System.out.println("Validator: TAM in JVM: " + Runtime.getRuntime().totalMemory());
            System.out.println("Validator: MAM JVM attempt to use: " +
Runtime.getRuntime().maxMemory());
         }
         objectHolder.add(new MemoryConsumer(MEMORY_BLOCK_SIZE));
         try
         {
            Thread.sleep(SLEEP_BETWEEN_ALLOCS);
         }
         catch(InterruptedException interruptedexception) { }
      }

METHOD AND APPARATUS TO ANTICIPATE MEMORY EXHAUSTION IN AN OPEN SERVICES GATEWAY INITIATIVE ENVIRONMENT

BACKGROUND OF THE INVENTION

1. Field of the Invention

The present invention relates generally to an improved data processing system and in particular to a method for anticipating memory exhaustion in data processing systems. Still more particularly, the present invention relates to a computer implemented method, apparatus, and a computer usable program product for anticipating memory exhaustion in an open services gateway initiative (OSGi) environment.

2. Description of the Related Art

Memory leak is a problem plaguing most data processing systems. A memory leak is an unintentional failure to dereference discarded objects so that the garbage collector of the data processing system cannot reclaim the memory for other uses. Diagnosing memory leaks is a daunting and time consuming task. Applications, application surfers, and entire data processing systems can hang, crash, or suffer other malfunctions due to a slow decline of free memory available. In the case of JAVA™ applications, the decline of free JAVA™ heap space can result in hang, crash, or other problems associated with the JAVA™ applications. Additionally, memory leaks are often to blame for decline in application server performance and overall system performance. Additionally, problems with memory leaks are one of the top time consuming issues in any product support.

Currently available tools for dealing with memory leaks only offer after-the-fact analysis and diagnostics. However, without knowing when memory exhaustion will occur, often no warning is provided to an end user before system degradation or system hang or crash occurs. For this reason, often no appropriate action is taken prior to an entire system or application crashing.

SUMMARY OF THE INVENTION

Illustrative embodiments provide for a computer implemented method for predicting a future status of a memory leak. A first set of data including memory consumption data is received at a software bundle. The software bundle is operating in an open services gateway initiative environment. Responsive to a determination that a memory leak exists, the first set of data is analyzed to predict a future status of the memory leak. The future status is stored, as stored data, in a storage device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a graphical user interface illustrating a test of a memory leak predictor bundle in accordance with an illustrative embodiment;

FIG. 7 shows a graphical user interface for performing a second test of a memory leak predictor bundle in accordance with an illustrative embodiment;

FIGS. 13A and 13B shows pseudo code for implementing a memory leak predictor bundle in accordance with an illustrative embodiment; and FIG. 14 shows pseudo code for implementing a memory leak validation bundle in accordance with an illustrative embodiment.

DETAILED DESCRIPTION OF THE PREFERRED EMBODIMENT

Figure 1:
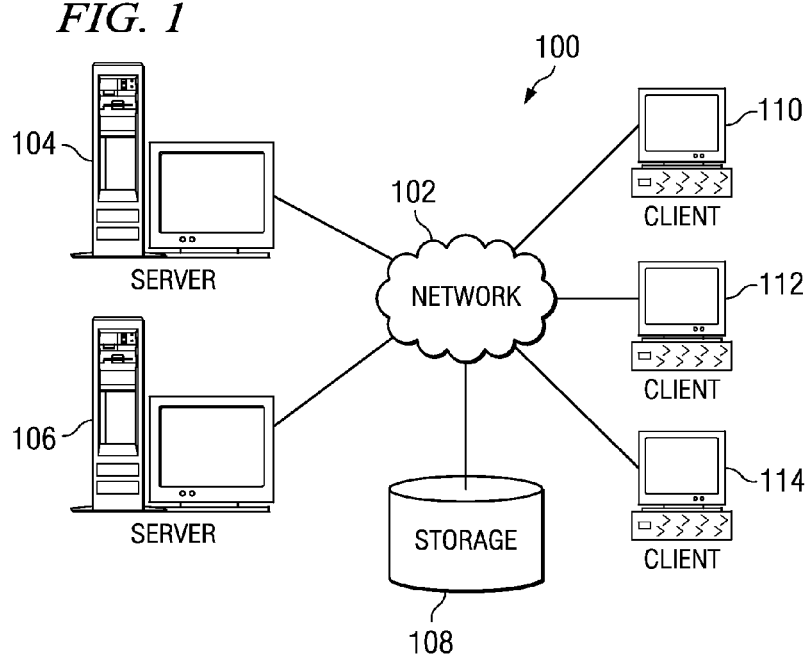
FIG. 1 is a pictorial representation of a network of data processing systems in which illustrative embodiments may be implemented.
Figure 2:
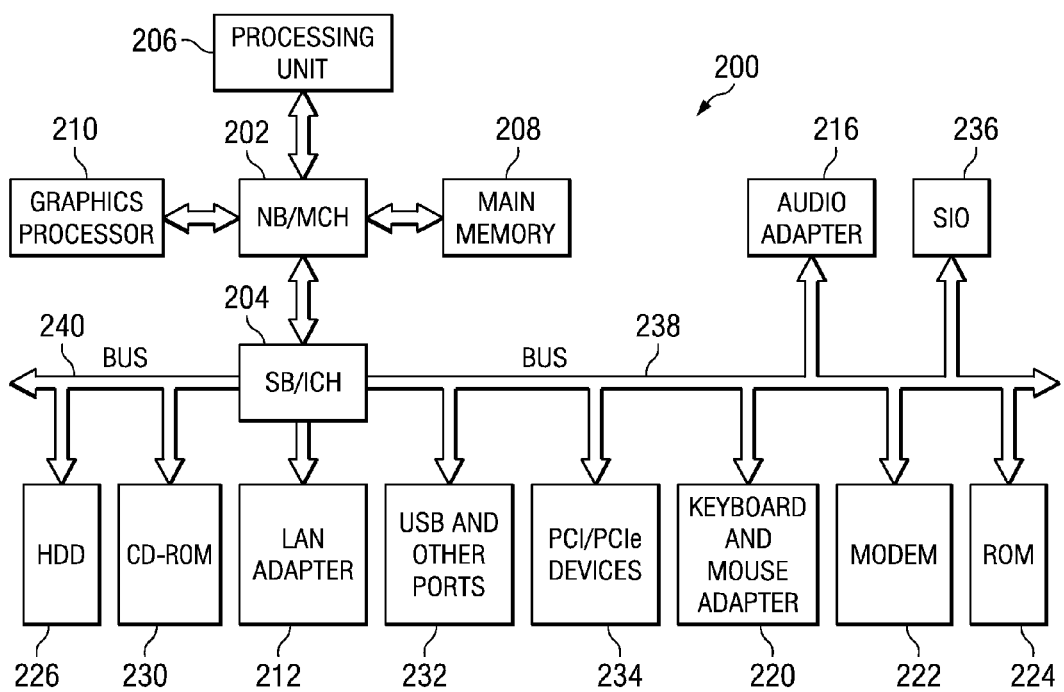
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. One or more of servers 104 and 106 or clients 110, 112, and 114, can act as a data processing system operating in an open services gateway initiative (OSGi) environment. Any of these data processing systems can have a memory leak that may cause problems. The illustrative embodiments described herein can be used to predict a future status of the memory leak or memory leaks, and possibly also to mitigate the memory leak or memory leaks.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the JAVA™ programming system, may run in conjunction with the operating system and provides calls to the operating system from JAVA™ programs or applications executing on data processing system 200. JAVA™ and all JAVA™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, flash memory, a hard drive, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide for a computer implemented method for predicting a future status of a memory leak. A first set of data including memory consumption data is received at a software bundle. The software bundle is operating in an open services gateway initiative environment. Responsive to a determination that a memory leak exists, the first set of data is analyzed to predict a future status of the memory leak. The future status is store, as stored data, in a storage device. A storage device could be main memory, flash memory, a hard drive, tape drive, or any other device for storing data.

Thus, the illustrative embodiments described herein, provide for a light-weight stand-alone software bundle designed for predicting memory exhaustion caused by memory leaks. In particular, the illustrative embodiments described herein provide for a software bundle to operate in an open services gateway initiative environment. This software bundle can be referred to as a memory leak predictor bundle.

The memory leak predictor bundle predicts memory exhaustion by collecting and analyzing historical memory consumption in a data processing system. The memory leak predictor bundle can estimate the amount of time left before a data processing system will run out of memory based on historical trend of memory consumption. The memory leak predictor bundle collects memory usage data based on configuration parameters, uses a mathematical model to analyze the memory usage, and then calculates a memory exhaustion timeline. The memory leak predictor bundle can also notify a user regarding the memory leak and/or invoke pre-defined actions if a memory leak is detected, or if the time to memory exhaustion is less than equal to a user-defined threshold. Additionally, the memory leak predictor bundle can be provided with other features to mitigate the memory leak. For example, the memory leak predictor bundle can be provided with features to isolate causes of memory leak, restart applications, or restart one or more data processing systems having memory leak. Another method of mitigating a memory leak is to stop allowing further service requests from being honored in order to slow a memory leak.

Figure 3:
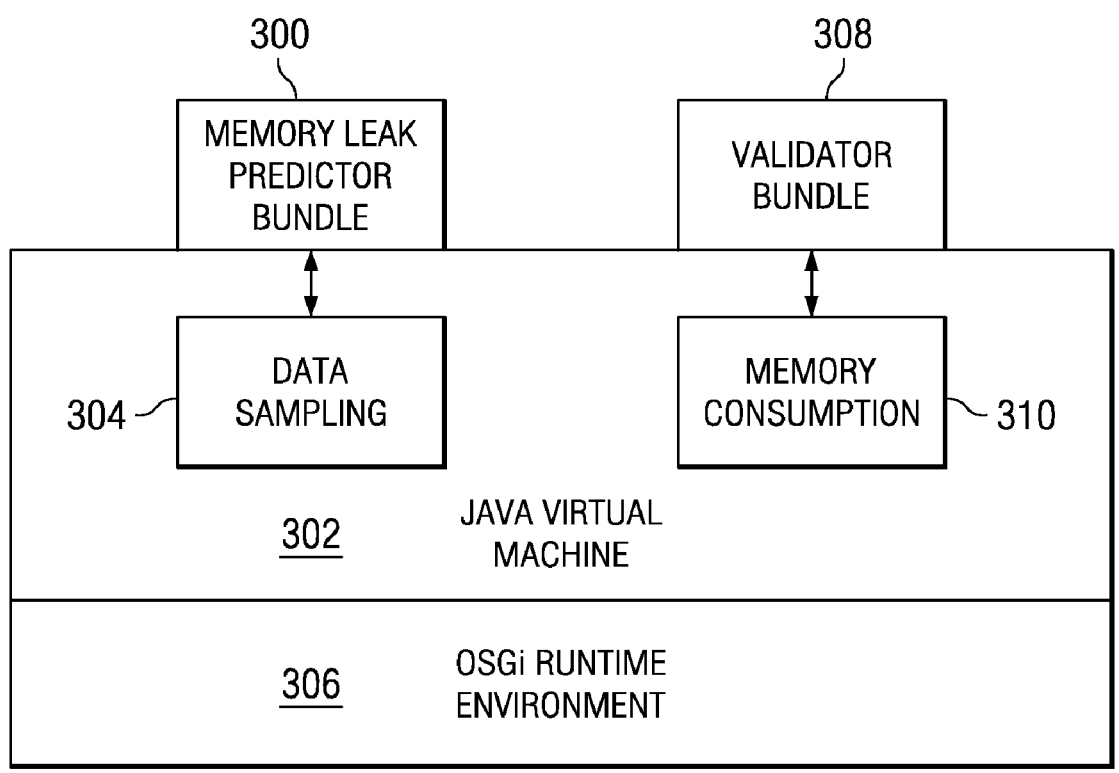
FIG. 3 is a block diagram of a memory leak predictor bundle operating in conjunction with a JAVA™ virtual machine in an open services gateway initiative environment in accordance with an illustrative embodiment.

FIG. 3 is a block diagram of a memory leak predictor bundle operating in conjunction with a JAVA™ virtual machine in an open services gateway initiative (OSGi) environment in accordance with an illustrative embodiment. An open services gateway initiative (OSGi) environment is a software environment having certain specifications. The core component of the OSGi specifications is the OSGi framework. The framework provides a standardized environment to applications, called bundles. The framework is divided in a number of layers. Additional information regarding the OSGi environment is available to one of ordinary skill. In any case, the system shown in FIG. 3 can be implemented in one or more data processing systems, such as clients 110, 112, and 114 and servers 104 and 106 as shown in FIG. 1 or data processing system 200 shown in FIG. 2. In an illustrative embodiment, the system shown in FIG. 3 can be implemented on a server such as servers 104 and 106 shown in FIG. 1 for use in monitoring behavior in one of clients 110, 112, or 114 as shown in FIG. 1. In the illustrative examples shown, however, the system operates on a single data processing system.

Memory leak predictor bundle 300 operates in conjunction with JAVA™ virtual machine 302 in order to collect samples of memory consumption data. Memory consumption data is data that relates to how much memory is consumed or has been consumed in one or more data processing systems. Examples of memory consumption data include data pertaining to memory available, memory available at a particular time, memory consumed by a particular application, and many others via data sampling 304. In these examples, memory leak predictor bundle 300 is implemented as a software program. However, memory leak predictor bundle 300 can also be implemented in hardware or some combination of software and hardware. Data sampling 304 can be implemented using any one of a number of data gathering techniques. Data sampling 304 gathers data regarding memory usage in JAVA™ virtual machine 302. Data sampling 304 can be accomplished via code provided in memory leak predictor bundle 300.

In the illustrative embodiments, JAVA™ virtual machine 302 is operating in an open services gateway initiative runtime environment 306. The illustrative embodiments shown can be implemented in a different runtime environment. For example, the illustrative embodiments can be implemented using any JAVA™ virtual machine runtime environment, such as but not limited to JAVA™ runtime environment (JRE) with update 6u1. A JAVA™ virtual machine runtime environment can be implemented in any configuration of hardware and software that supports JAVA™. However, memory leak predictor bundle 300 is preferably operated in open services gateway initiative runtime environment 306 because in this environment memory leak predictor bundle 300 can easily be implemented into existing applications in existing data processing systems and in particular in conjunction with JAVA™ virtual machine 302.

Optionally, validator bundle 308 can also be provided to operate in conjunction with JAVA™ virtual machine 302 in an open services gateway initiative runtime environment 306. Validator bundle 308 operates to deliberately consume memory as shown via memory consumption means 310. Memory consumption means 310 can be any means for deliberately consuming memory, such as software or hardware that causes available memory of a data processing system to be consumed. However, validator bundle 308 consumes memory via memory consumption means 310 at a pre-defined rate.

In the illustrative examples shown, memory leak predictor bundle 300 estimates an exhaustion time. An exhaustion time is an amount of time before a system or application runs out of memory at a given rate of memory consumption or historical rate of memory consumption. Memory leak predictor bundle 300 collects memory usage data in JAVA™ virtual machine 302 using a number of parameters as described below. Memory leak predictor bundle 300 then analyzes the memory usage, calculates the memory exhaustion timeline, and sends out a notification to a user if the exhaustion time is less than or equal to a user-defined threshold. In these examples, memory leak predictor bundle 300 uses a linear regression technique to perform the memory usage analysis. This technique is a comprehensive and accepted regression analysis technique. In particular, linear regression is a technique for finding the best fitting straight line through a series of data points. The regression line represents the memory usage trend in this illustrative example. Other analysis techniques can also be used, such as but not limited to multi-linear regression models or multi-variate regression models.

In general, a line can be represented mathematically by the equation y=mx+b in a two-dimensional graph using a y-axis and an x-axis, where m is a slope of a line and b is a constant. In linear regression, the values of m and b are represented by the following equations:

$$m = \frac{n\sum(xy) - \sum x \sum y}{n\sum(x^2) - (\sum x)^2}$$

$$b = \frac{\sum y - m\sum x}{n}$$

In the illustrative example shown, memory usage data is taken by data sampling 304 only at times other than startup. At startup, memory use is not stable and does not represent a regular usage trend. However, memory usage data collected during startup time can be used, if desired.

Data sampling 304 samples memory usage data caused by memory consumption means 310 at the pre-defined rate. The pre-defined rate can be user-defined or can be defined based on historical memory usage. The rate of data sampling can be selected between continuous sampling and any particular length of time. However, practically speaking, data sampling is usually not conducted continuously or too often, because data sampling can reduce system performance in some data processing systems or applications. However, if memory leak predictor bundle 300 does not receive a sufficient number of data points regarding memory consumption, not enough data will exist to perform accurate linear regression. A user can select the data sampling rate based on the user preferences, or memory leak predictor bundle 300 can adjust the sampling rate, based on user-defined policies comparing system performance to a desired range of sample data points.

Ultimately, memory leak predictor bundle 300 predicts an exhaustion time. Again, an exhaustion time is an amount of time before a system or application runs out of memory at a given rate of memory consumption or historical rate of memory consumption. Similarly, an exhaustion time can be an amount of time before a threshold is reached.

The threshold can be user-defined or can be defined by a set of policies in memory leak predictor bundle 300. The illustrative examples of thresholds include memory consumption reaching a certain percentage of total memory available, degradation of the data processing system based on available memory, degradation of one of more applications based in available memory, or any other time.

When the threshold is reached, memory leak predictor bundle 300 will issue a warning or a notification to a user. The warning or notification can include the historical trend of the memory leak, a reminder regarding exhaustion time, the predicted loss of memory due to the memory leak, the predicted time to system degradation, the predicted time to system crash, the predicted time to application degradation, and the predicted time to application crash.

In addition, memory leak predictor bundle 300 or some other associated bundle can take an action to mitigate the memory leak. An action to mitigate the memory leak can be an action to slow the memory leak or to stop the memory leak. For example, an application causing the memory leak can be identified and the application stopped or restarted. Similarly, a particular data processing system or operating system can be stopped or restarted. In some illustrative examples, an application can be isolated in order to prevent the memory leak from affecting other data processing systems or other areas of memory. Another method of mitigating a memory leak is to stop allowing further service requests from being honored in order to slow a memory leak.

In this illustrative example, memory leak predictor bundle 300 can be modified with one or more user configured parameters. The parameters can also be set by a manufacturer. The parameters described below are exemplary only; other parameters can also be included.

The parameters in this illustrative example are recorded in a configuration file which is read by memory leak predictor bundle 300 at startup. Memory leak predictor bundle 300 caches the parameter settings, which are then used to perform memory usage data collection, memory usage trends, and to predict the exhaustion time.

One parameter includes MemUsageDataPoints. This parameter is a list of memory usage data points that are collected at equal distance time intervals. The parameter is used to forecast the exhaustion time.

Another parameter is MaxDataPointsCached, which is represented by an integer value. This parameter defines the maximum number of memory usage data points to be saved and used for memory usage analysis and exhaustion time prediction. Once the collected data points exceed this parameter, the oldest data point will be deleted from the cache data points list.

An example of another parameter is MinDataPointsToStart, which is represented by an integer value. This parameter defines the minimum number of data points required to start a regression calculation and the exhaustion time.

Yet another parameter that may be used is SamplingInterval. This parameter is also an integer value. This parameter defines the amount of time the memory leak predictor bundle sleeps before collecting a next memory usage data point. In the illustrative examples shown, the sampling time is recorded in seconds, although any particular sampling time interval can be used.

Another parameter that can be used is MemoryUsageThreshold, which is represented by an integer value. This parameter defines the maximum number of bytes used in memory before a system is considered to run out of memory.

Another illustrative parameter is ExhaustTimeThreshold, which is represented by an integer value. This parameter defines the maximum time before which an action will be taken or a notification will be presented to a user. If a predicted exhaustion time is equal to or less than this parameter, memory leak predictor bundle 300 will take an action to isolate, stop, or slow down a memory leak and/or to present a notification to the user.

Another example of a parameter is ActionToTake. This parameter is a callback that allows memory leak predictor bundle 300 to invoke actions when exhaustion criteria are met. Exhaustion criteria are met when an exhaustion time is equal to or exceeds a threshold. For example, a callback can be a function that warns the administrator that a memory leak is occurring. The callback can be a function that warns the administrator regarding the time to memory exhaustion. A callback could also be a function that stops allowing further service requests from being honored in order to slow a memory leak. A callback could also be a function that terminates or restarts an application or data processing system causing the memory leak.

In addition to memory leak predictor bundle 300, validator bundle 308 can be used to validate the performance of memory leak predictor bundle 300 or to calibrate memory leak predictor bundle 300. Validator bundle 308 can be used to test the behavior of memory leak predictor bundle 300 under different memory usage conditions. Validator bundle 308 can simulate application behavior under different conditions and functions of an application. In the illustrative example, validator bundle 308 can be used to command memory leak predictor bundle 300 to stop or start.

In the illustrative embodiment, validation bundle 308 is also an open services gateway initiative bundle. Validation bundle 308 provides several user configurable parameters. In other illustrative embodiments, the parameters are pre-defined. Not all the parameters described below need to be included in validator bundle 308 and other additional parameters can be included in validator bundle 308. In the illustrative embodiments, parameters are recorded in configuration file. The validator bundle reads the configuration file during bundle time start and caches the parameter settings in memory. The parameters are used to perform memory consumptions to simulate application behavior.

An example of a validator bundle parameter is Max_Consumed_Memory. This parameter is an integer that defines a maximum amount of memory to be consumed before memory consumption ceases. In the illustrative embodiment, this parameter also defines the time before validator bundle 308 stops operating.

Another parameter for validator bundle 308 is Memory_Block_Size. This parameter is an integer defining a size in bytes of memory consumed by any given memory consumption action. Validator bundle 308 can take multiple memory consumption actions. Each memory consumption action consumes a given amount of memory via memory consumption means 310. In another illustrative embodiment, this parameter is a list of integers that define a size of memory consumed in a number of different consumption actions. Thus, each memory consumption action can consume a different amount of memory. Accordingly, this parameter can be used to simulate a runtime environment in which non-linear memory usage is occurring.

Another parameter for validator bundle 308 is Sleep_Between_Allocs. This parameter is an integer that defines a length of time, expressed in milliseconds, before a validator bundle 308 sleeps before the next memory consumption action. In other illustrative examples, the length of time can be expressed in any particular time increment.

Another parameter for validator bundle 308 is Log_Output. This parameter defines whether a logging message should be printed to a console or otherwise presented to the user. If this parameter is activated, logs can be presented to the user; otherwise, logs will not be presented to the user.

As described above, memory leak predictor bundle 300 can not only predict memory exhaustion, but can also assist in mitigating a memory leak. Mitigation of a memory leak can be performed by any of the embodiments described above, including stopping or restarting applications or data processing systems causing the memory leak, or by other methods as described above. In the illustrative embodiment, memory leak predictor bundle 300 can identify a source of a memory leak by using the following method. First memory leak predictor bundle 300 searches a data processing system's registry for a set of applications or processes that could be the source of the memory leak. Second, memory leak predictor bundle 300 identifies the location in memory of the applications via the registry. For example, memory leak predictor bundle 300 can receive details of these applications in the registry. In an illustrative example, the details are on the jar of the bundles in the registry. Memory leak predictor bundle 300 can then stop one application or bundle at a time to evaluate a drop in memory usage. This step is repeated until the culprit application or bundle is identified. The culprit application or bundle is the application or bundle that is causing the memory leak. Once the culprit application or bundle is identified, then the culprit application or bundle is stopped or will not be started until the memory leak is eliminated, such as by restarting the data processing system. Memory leak predictor bundle 300 can then allow the previous culprit application or bundle to continue operation.

Figure 4:
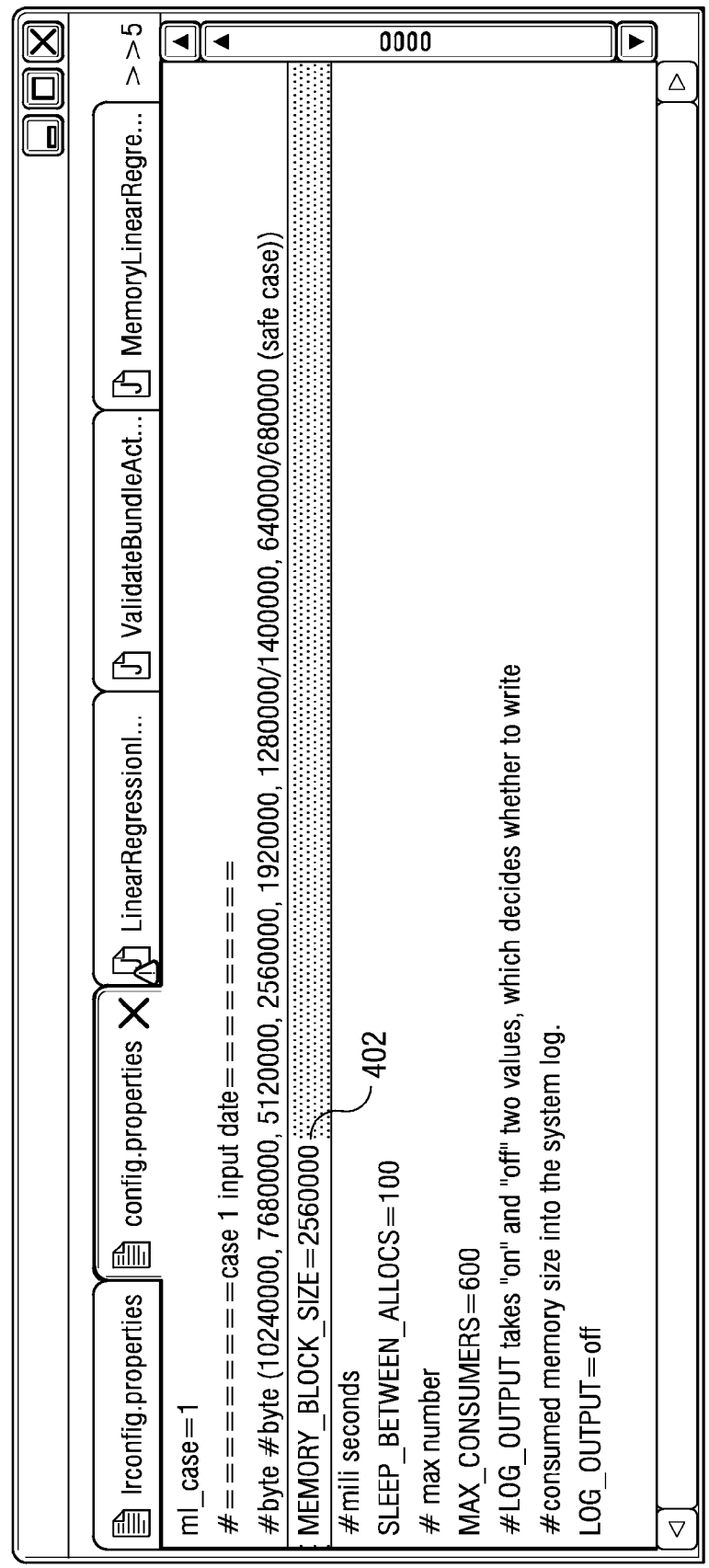
FIG. 4 shows a graphical user interface illustrating a program for testing a memory leak predictor bundle in accordance with an illustrative embodiment.

FIG. 4 shows a graphical user interface illustrating a program for testing a memory leak predictor bundle in accordance with an illustrative embodiment. The graphical user interface shown in FIG. 4 can be implemented in a data processing system, such as servers 104 or 106 or clients 110, 112, or 114 shown in FIG. 1 or data processing system 200 shown in FIG. 2. The graphical user interface shown in FIG. 4 is also an exemplary graphical user interface for a memory leak predictor bundle, such as memory leak predictor bundle 300 shown in FIG. 3. The graphical user interface shown in FIG. 4 is exemplary only and does not imply any architectural or other limitations on the claimed inventions.

Graphical user interface 400 illustrates the test of a memory leak predictor bundle using pre-defined memory allocation. Graphical user interface 400 also shows a predicted time in memory exhaustion based on memory consumption.

The objective of the test shown in graphical user interface 400 is to simulate allocation of sufficient data points for the memory leak predictor bundle to predict the time to complete memory exhaustion. Various memory allocation sizes are used, ranging from 64 megabytes to 256 megabytes. However, in most real applications, the memory block size consumed during a memory leak is expected to be a significantly smaller number, usually on the order of a few kilobytes. However, memory leak predictor bundle 300 in FIG. 3 can operate in any environment having a memory leak of any particular size, so long as sufficient data points are available.

As shown at line 402, memory consumption is defined at 256 megabytes every ten seconds. Thus, in this illustrative example, the out of memory situation should arise in approximately forty seconds after four data points.

FIG. 5 is a graphical user interface illustrating a test of a memory leak predictor bundle in accordance with an illustrative embodiment. Graphical user interface 500 shown in FIG. 5 is an extension of graphical user interface 400 shown in FIG. 4.

As shown by line 502, a heap dump was generated after forty seconds or after four data points. The user was notified at the threshold time of less than five seconds to complete memory exhaustion, as was expected. Thus, the tests shown in graphical user interface 400 of FIG. 4 and 500 of FIG. 5 shows that memory leak predictor bundle accurately predicted an exhaustion time and also reported an amount of time to memory exhaustion.

Figure 6:
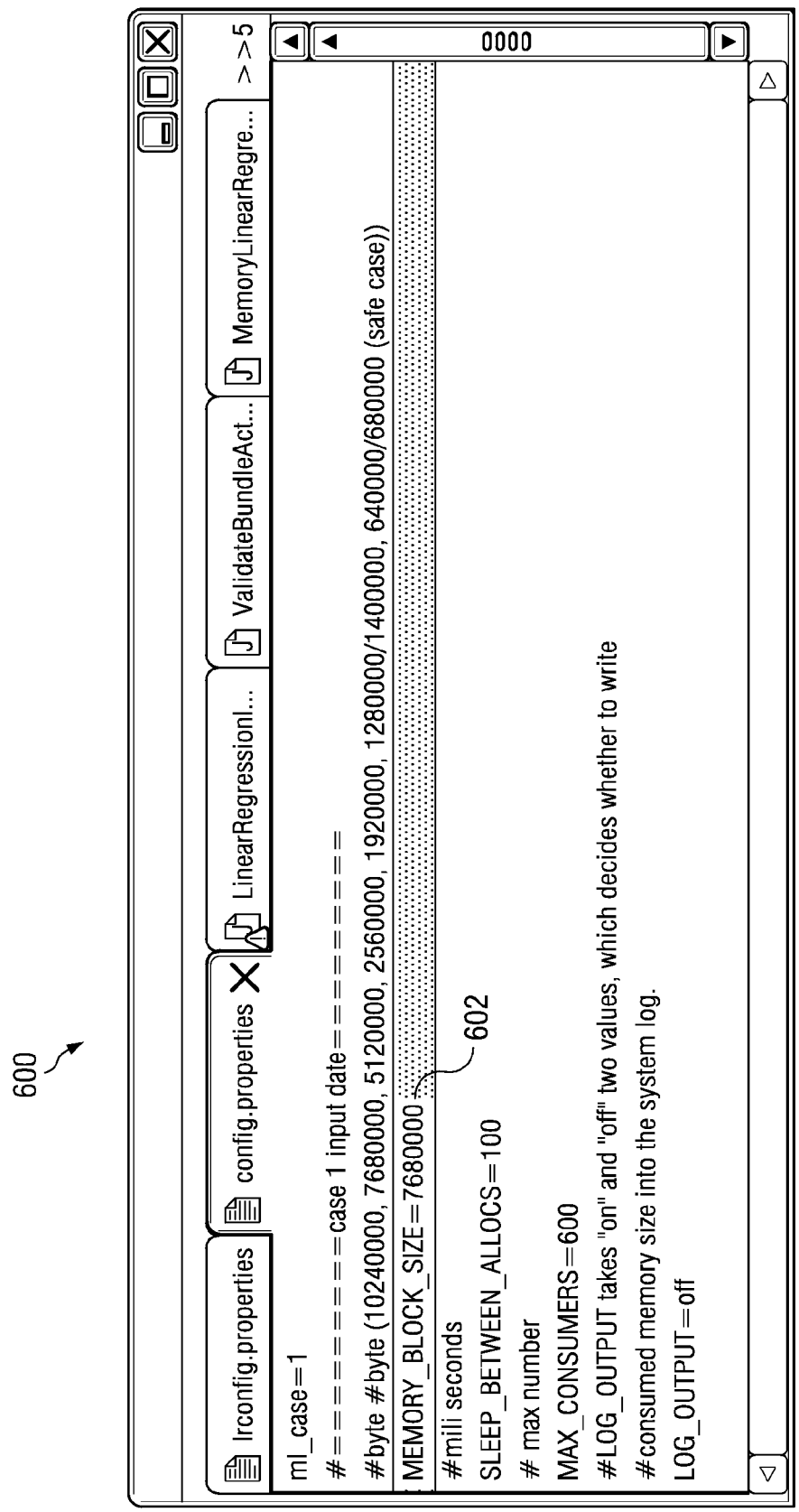
FIG. 6 shows a graphical user interface illustrating a second test of a memory leak predictor bundle in accordance with an illustrative embodiment.

FIG. 6 shows a graphical user interface illustrating a second test of a memory leak predictor bundle in accordance with an illustrative embodiment. The graphical user interface shown in FIG. 6 can be implemented on a data processing system, such as servers 104 and 106 or clients 110, 112, and 114 of FIG. 1 or data processing system 200 in FIG. 2. Graphical user interface 600 shown in FIG. 6 is similar to graphical user interface 400 in FIG. 4 in that graphical user interface 600 shows a test of a memory leak predictor bundle. However, graphical user interface 600 shows a different test than that in FIG. 4.

The test shown in FIG. 6 is provided to illustrate the effect of extreme memory leaks, which cause expedient memory exhaustion. As a result of the extreme memory leak, notification failure occurred. Notification failure occurs due to inadequate data points required for the algorithm to begin calculating a slope of data points to predict the approximate time of complete memory exhaustion.

As shown by line 602 in the tests shown in FIG. 6, memory consumption is set at 768 megabytes every ten seconds. Thus, an out of memory situation should arise in approximately ten seconds and right after a single data point.

FIG. 7 shows a graphical user interface for performing a second test of a memory leak predictor bundle in accordance with an illustrative embodiment. Graphical user interface 700 shown in FIG. 7 is an extension of graphical user interface 600 shown in FIG. 6.

As shown by line 702, the heap dump is generated after a little more than ten seconds or after one data point. However, the user is not notified of the time to complete memory exhaustion. This result was expected, because the algorithm of the memory leak predictor bundle was set to use at least four data points to begin calculating the slope of the linear regression. The slope of the linear regression corresponds to rate at which memory is leaking or being consumed, because each point of the line represents memory consumption at a given time.

Figure 8:
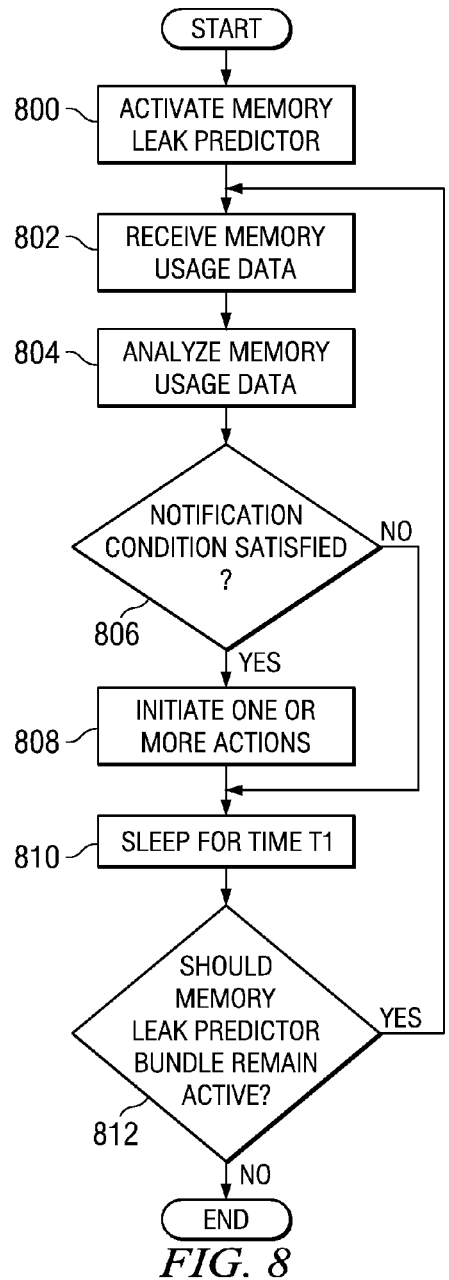
FIG. 8 is a flowchart illustrating operation of a memory leak predictor bundle in accordance with an illustrative embodiment.

FIG. 8 is a flowchart illustrating operation of a memory leak predictor bundle in accordance with an illustrative embodiment. The process shown in FIG. 8 can be implemented in a data processing system such as server 104 and 106 or clients 110, 112, and 114 shown in FIG. 1 or data processing system 200 shown in FIG. 2. The process shown in FIG. 8 can be implemented in a memory leak predictor bundle, such as memory leak predictor bundle 300 shown in FIG. 3.

The process begins as the memory leak predictor bundle is activated (step 800). Next, the memory leak predictor bundle receives memory usage data (step 802). Memory usage data can be any data regarding memory consumption in a data processing system. In the illustrative embodiment, memory usage data is data that indicates an amount of memory consumed or available in the data processing system or application.

Next, the memory leak predictor bundle analyzes the memory usage data (step 804). Memory usage data can be analyzed using any number of statistical techniques. In the illustrative embodiment, memory usage data is analyzed using a linear regression technique as described with respect to FIG. 3. Other analysis techniques can also be used, such as but not limited to multi-linear regression models or multivariate regression models.

The memory leak predictor bundle then determines whether a notification condition has been satisfied (step 806). A notification condition can be any pre-defined threshold. An example of a pre-defined threshold is a calculated time to an out of memory condition or exhaustion time. Another example of a pre-defined threshold can be degradation in performance of an application, bundle, or data processing system due to memory leak. Another example of a notification condition or threshold can be a crash or hang of an application, bundle, or data processing system due to an out of memory condition.

However, if the notification condition has been satisfied (a "yes" to the determination of step 806), then the memory leak predictor initiates one or more actions (step 808). The one or more actions can be to issue a notification to a user. A notification to a user can include any information regarding a memory leak, including a time to an "out of memory" condition, identification of which applications or bundles are causing a memory leak, historical data of the memory leak, or any other information. One or more actions can also include actions to mitigate a memory leak, as described with respect to FIG. 3.

After initiating one or more actions at step 808, or if notification condition as not been satisfied at step 806, then the memory leak predictor bundle sleeps for a time T1 (step 810). The term sleep, in this illustrative example, means that the memory leak predictor bundle does not receive additional data or does not collect or process additional data. The time T1 indicates the amount of time that the memory leak predictor bundle is not receiving new memory usage data.

The memory leak predictor bundle then determines whether the memory leak predictor bundle should remain active (step 812). If the memory leak predictor bundle should remain active (a "yes" determination to step 812), then the process returns to step 802 and repeats. If memory leak predictor bundle is not to remain active (a "no determination to step 812), then the process terminates.

Figure 9:
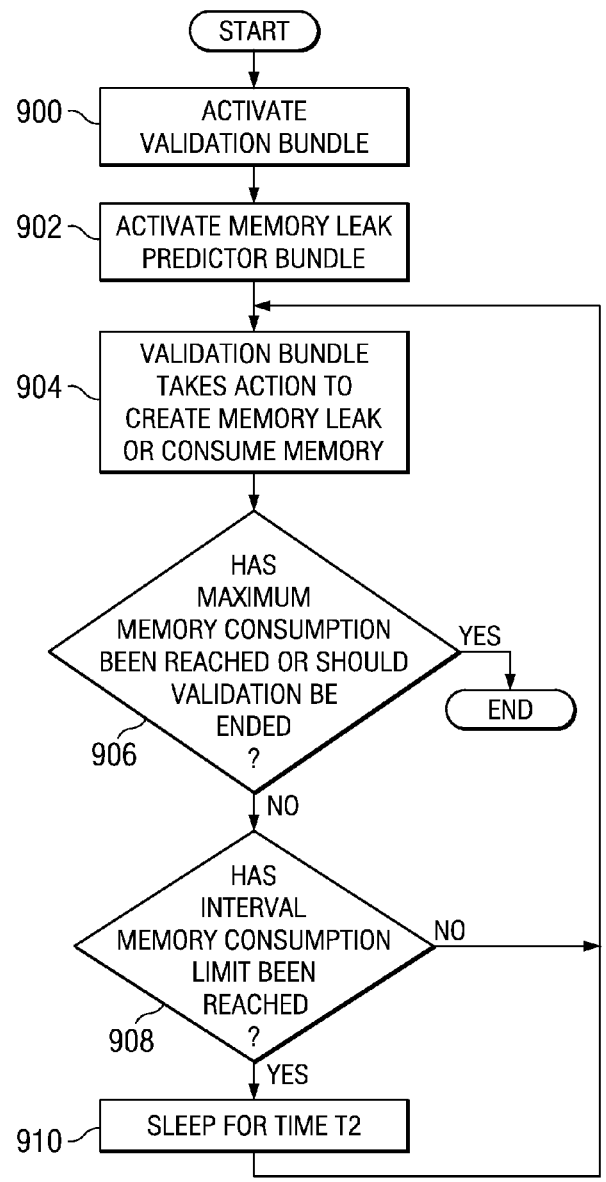
FIG. 9 is a flowchart illustrating operation of a validation bundle for a memory leak predictor bundle in accordance with an illustrative embodiment.

FIG. 9 is a flowchart illustrating operation of a validation bundle for a memory leak predictor bundle in accordance with an illustrative embodiment. The process shown in FIG. 9 can be implemented in a data processing system such as server 104 and 106 or clients 110, 112, and 114 as shown in FIG. 1 or data processing system 200 as shown in FIG. 2. The process shown in FIG. 9 can be implemented using a validation bundle, such as validation bundle 308 shown in FIG. 3.

The process shown in FIG. 9 begins as the validation bundle is activated (step 900). Next, the memory leak predictor bundle is activated by the validation bundle (step 902). In other illustrative examples, the memory leak predictor bundle in step 902 could already be operating, or could be activated by some mechanism present in the validation bundle.

The validation bundle then takes an action to create a memory leak or to otherwise consume memory (step 904). The validation bundle then determines whether a maximum memory consumption has been reached or if the validation process should be ended (step 906). If the maximum memory consumption has not been reached or the validation should not be ended, then the validation bundle determines whether an interval memory consumption limit has been reached (step 908). An interval memory consumption limit is an amount of memory consumed within a particular time period. The time period can be less than the time period for time period T2 in step 910.

In the illustrative example, the interval memory consumption limit is reached every time memory is consumed at step 904. If the interval memory consumption limit has been reached at step 908, the validation bundle sleeps for a time T2 (step 910). The term sleep in this context means that validation bundle at step 900 does not take an action to create a memory leak or otherwise consume memory. After sleeping for time T2, or if the interval memory consumption limit has not been reached at step 908, the process returns to step 904. Returning to step 906, if maximum memory consumption has been reached or if validation should be ended, then the process terminates.

Figure 10:
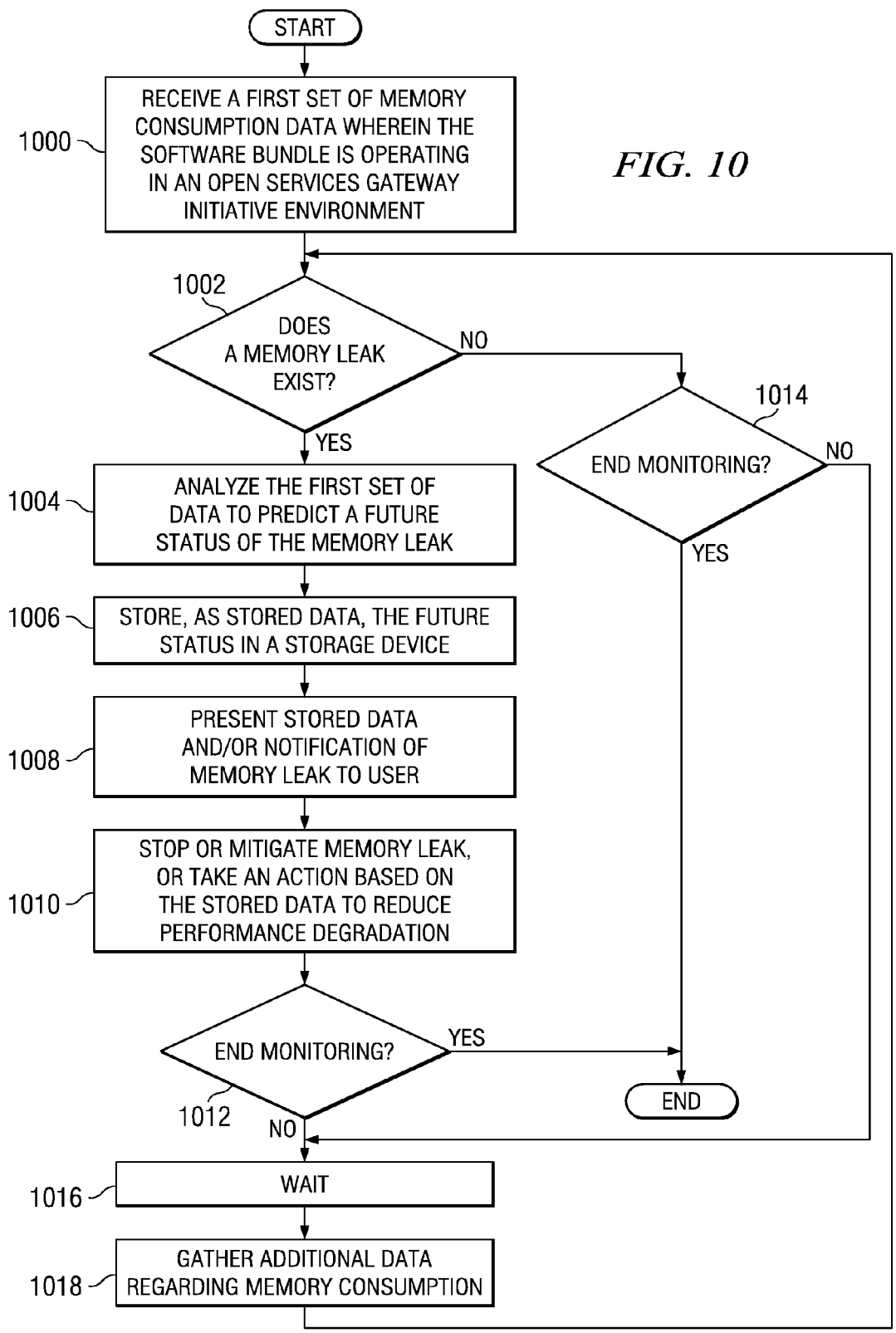
FIG. 10 is a flowchart illustrating operation of a memory leak predictor bundle in accordance with an illustrative embodiment.

FIG. 10 is a flowchart illustrating operation of a memory leak predictor bundle in accordance with an illustrative embodiment. The process shown in FIG. 10 can be implemented in a data processing system such as servers 104 and 106 or clients 110, 112, and 114 as shown in FIG. 1 or data processing system 200 as shown in FIG. 2. The process shown in FIG. 10 can be implemented using a memory leak predictor bundle, such as memory leak predictor bundle 300 shown in FIG. 3.

The process begins as a software bundle receives a first set of memory consumption data, wherein the software bundle is operating in an open services gateway initiative environment (step 1000). The memory leak predictor bundle then determines whether a memory leak exists (step 1002). In other illustrative embodiments, a memory leak is detected by other processes of the data processing system. Alternatively, the memory leak is not detected at all and, instead, only memory consumption history data is detected or analyzed.

If a determination whether a memory leak exists is made at step 1002 and a memory leak does exist, then the memory leak predictor bundle analyzes the first set of data to predict a future status of the memory leak (step 1004). As used herein, a future status of a memory leak is any parameter relating to a subsequent condition of a memory leak or subsequent condition of consumption of data. In an illustrative example, a future status of a memory leak is an amount of time to an out of memory condition or exhaustion time.

Another example of a future status of a memory leak is an amount of memory predicted to be consumed at a future time. Other future status of memory leaks include a projected results of a linear regression analysis, an increase of rate of memory consumption, a decrease in the rate of memory consumption, a prediction as to when an application or software bundle will degrade in performance, a prediction as to when an application or software bundle will terminate due to a memory leak, a prediction as to a time when a data processing system will degrade due to a memory leak, and a prediction as to the time when a data processing system will crash or hang due to a memory leak.

The memory leak prediction bundle stores as stored data the future status of the memory leak in a storage device (step 1006). The memory leak predictor bundle then causes a notification to be presented to a user (step 1008). The notification indicates that the memory leak exists. The notification can also include the stored data or a summary of the stored data. In other illustrative embodiments, the notification can be modified so that less or more information is presented to a user. In another illustrative embodiment, this step may be skipped.

The memory leak predictor bundle then optionally stops or mitigates the memory leak, or takes an action based on the stored data to reduce performance degradation of the data processing system or application (step 1010). The memory leak predictor bundle then determines whether monitoring should be ended (step 1012). Similarly, a "no" determination at step 1002 also causes the memory leak predictor bundle to determine whether monitoring should be ended (step 1014). In either case, if monitoring is not to be ended, then the memory leak predictor bundle waits for a time (step 1016). The time can be a sleep time. A sleep time is a period of time during which the memory leak predictor bundle is not operating, not receiving data, or not making determinations.

The memory leak predictor bundle then gathers additional data regarding memory consumption (step 1018). Additional data regarding memory consumption can include analyzing the current memory status of the data processing system, the amount of memory used by an application or bundle, or any other data regarding memory. The process then repeats beginning at step 1002.

Returning to step 1002, if a determination is made whether a memory leak exists and the memory leak does not exist, then as described above the memory leak predictor bundle determines whether to end monitoring at step 1014. The memory leak predictor bundle makes a similar determination at step 1012 after stopping or mitigating the memory leak at step 1010. In either case, if monitoring is to be ended, then the process terminates.

Figure 11:
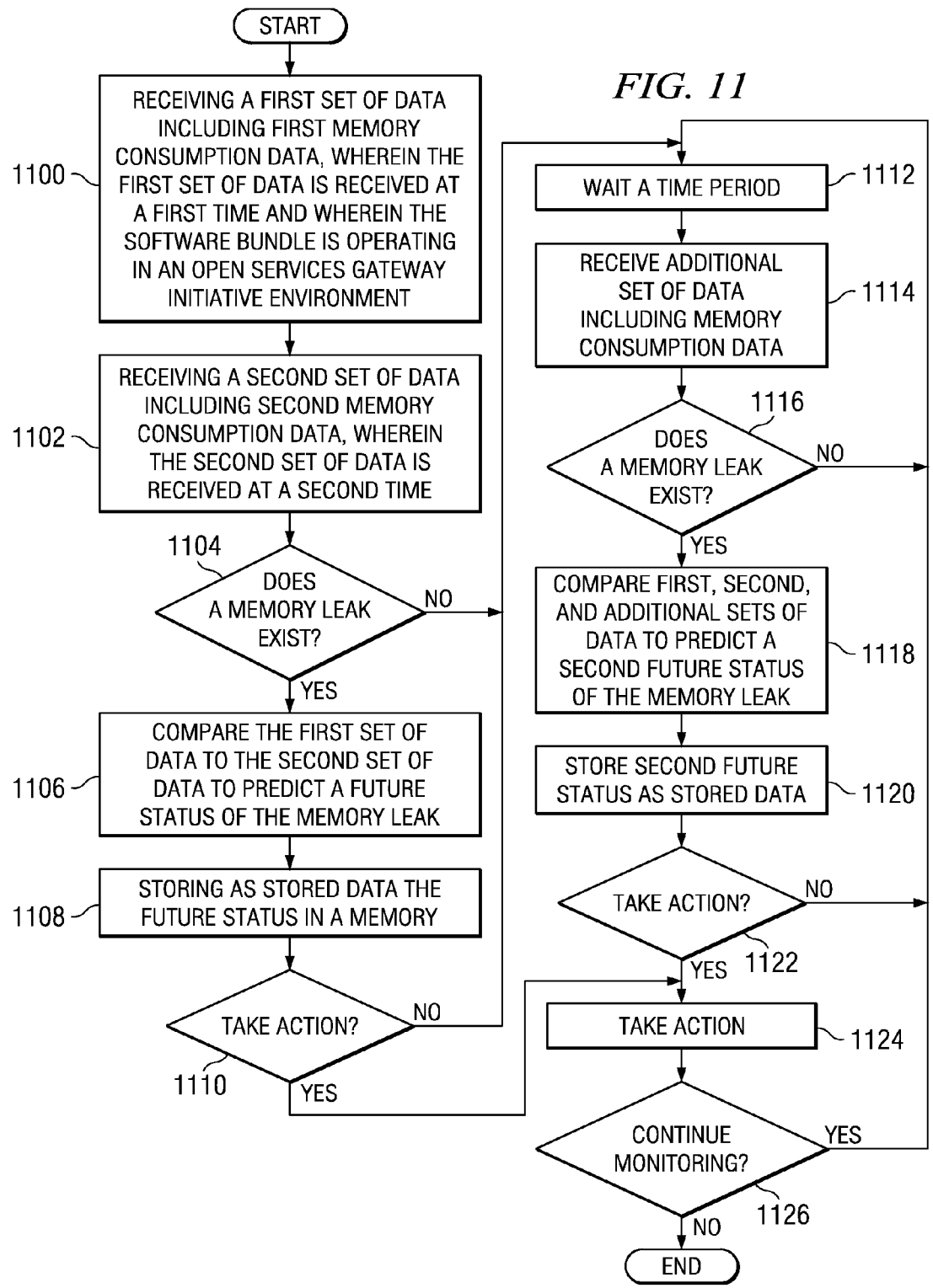
FIG. 11 is a flowchart illustrating operation of a memory leak predictor bundle in accordance with an illustrative embodiment.

FIG. 11 is a flowchart illustrating operation of a memory leak predictor bundle in accordance with an illustrative embodiment. The process shown can be implemented in a data processing system such as servers 104 and 106 or clients 110, 112, and 114 as shown in FIG. 1 or data processing system 200 as shown in FIG. 2. In particular, the process shown in FIG. 11 can be implemented using the memory leak predictor bundle, such as memory leak predictor bundle 300 shown in FIG. 3.

The process begins as the memory leak predictor bundle receives a first set of data including first memory consumption data, wherein the first set of data is received at a first time and wherein the software bundle is operating in an open services gateway initiative environment (step 1100). The memory leak predictor bundle then receives a second set of data including second memory consumption data, wherein the second set of data is received at a second time (step 1102).

The memory leak predictor bundle optionally then determines whether a memory leak exists (step 1104). In other illustrative embodiments, memory leak predictor bundle can receive data indicating the existence of the memory leak from some other process or can simply skip step 1104.

If a memory leak exists (a "yes" determination at step 1104), then the memory leak predictor bundle compares the first set of data to the second set of data to predict a future status of the memory leak (step 1106). The future status of a memory leak can be as described with respect to FIG. 10. The memory leak predictor bundle then stores as stored data the future status in a memory (step 1108).

The memory leak predictor bundle then determines whether to take an action (step 1110). If an action is to be taken, then the memory leak predictor bundle takes an appropriate action, such as those described above. If no action is to be taken, then the memory leak predictor bundle waits for a time period as described with respect to FIG. 10 (step 1112).

The memory leak predictor bundle then receives additional sets of data regarding memory consumption data (step 1114). Again, optionally, the memory leak predictor bundle determines whether a memory leak exists (step 1116). If a determination whether a memory leak exists is made and no memory leak exists, then the process returns to step 1112. If a memory leak does exist (a "yes" determination at step 1116), then the memory leak predictor bundle compares first, second, and additional sets of data to predict the second future status of the memory leak (step 1118). In comparing first, second, and additional sets of data to predict the second future status of the memory leak, the second future status of the memory leak can change compared to the first future status of the memory leak. Thus, the memory leak predictor bundle can predict non-linear changes in the memory leak. The memory leak predictor bundle then stores the second future status as stored data (step 1120).

As with step 1110, the memory leak predictor bundle then determines whether to take an action (step 1122). If no action is to be taken, then the memory leak predictor bundle waits a time period, as in step 1112. At either step 1110 or 1122, if the memory leak predictor bundle is to take action, then the memory leak predictor bundle takes an action (step 1124). The action can be any action such as those described with respect to FIG. 10. After taking an action, the memory leak predictor bundle makes a determination whether to continue monitoring (step 1126). If monitoring is continued, then the process returns to step 1112, from where the process repeats. If monitoring is to discontinue at step 1126, then the process terminates.

Figure 12:
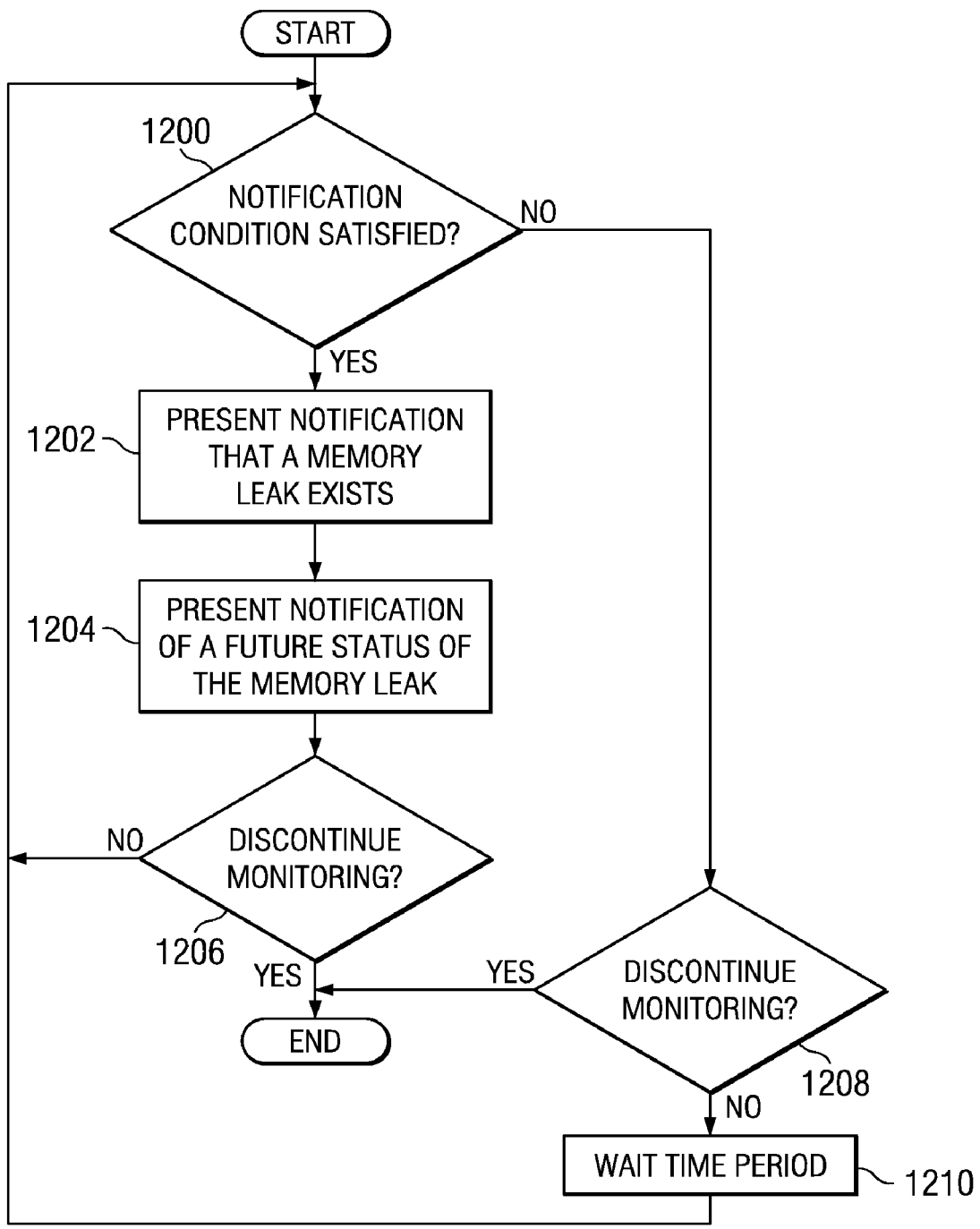
FIG. 12 is a flowchart illustrating a process for notifying a user if a memory leak condition exists in accordance with an illustrative embodiment.

FIG. 12 is a flowchart illustrating a process for notifying a user if a memory leak condition exists in accordance with an illustrative embodiment. The process shown in FIG. 12 can be implemented in a data processing system such as servers 104 and 106 or clients 110, 112, and 114 as shown in FIG. 1 or data processing system 200 as shown in FIG. 2. The process shown in FIG. 12 can be implemented in a memory leak predictor bundle, such as memory leak predictor bundle 300 shown in FIG. 3.

The process begins as the memory leak predictor bundle determines whether a notification condition has been satisfied (step 1200). If the notification condition has been satisfied, then the memory leak predictor bundle presents a notification that a memory leak exists to a user (step 1202). The memory leak predictor bundle then presents a notification of the future status of the memory leak to the user (step 1204).

The memory leak predictor bundle then determines whether to discontinue monitoring (step 1206). If monitoring is to continue, then the process returns to step 1200 and the process repeats. Otherwise, if the monitoring is to discontinue, then the process terminates.

Returning to step 1200, if the notification condition has not been satisfied, then again a determination is made whether to discontinue monitoring (step 1208). If monitoring is continued, then the memory leak predictor bundle waits a time period (step 1210). The process then returns to step 1200. If the memory leak predictor bundle is to discontinue monitoring at step 1208, then the process terminates.

FIGS. 13A and 13B show pseudo code for implementing a memory leak predictor bundle in accordance with an illustrative embodiment. FIG. 14 shows pseudo code for implementing a memory leak validation bundle in accordance with an illustrative embodiment. For FIGS. 13A, 13B and 14, the pseudo code can be implemented in a data processing system such as servers 104 and 106 or clients 110, 112, and 114 as shown in FIG. 1 or data processing system 200 as shown in FIG. 2. The pseudo code shown in FIGS. 13A and 13B can be used to implement a memory leak predictor bundle, such as memory leak predictor bundle 300 shown in FIG. 3. The pseudo code shown in FIG. 14 can be used to implement a validator bundle, such as validator bundle 308 shown in FIG. 3.

Thus, the illustrative embodiments described herein provide for a computer implemented method for predicting a future status of a memory leak. The first set of data including memory consumption data is received at a software bundle. The software bundle is operated in an open services gateway initiative environment. Responsive to a determination that a memory leak exists, the first set of data is analyzed to predict a future status of the memory leak. The future status is stored as stored data in a memory.

The illustrative embodiments described herein provide for a light-weight stand-alone solution for predicting memory exhaustion or memory leaks in an open services gateway environment. The illustrative embodiments described herein can also be used to predict memory leaks or memory exhaustion in other environments. No other method for predicting memory leaks or a future status of a memory leak is known. In this manner, the different illustrative embodiments can be used to issue warnings to information technology personnel, who can take action to prevent damage or inconvenience caused by memory leaks.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method comprising:
   receiving, at a software bundle, a first set of data comprising memory consumption data;
   responsive to a determination that a memory leak exists, analyzing the first set of data to predict a future status of the memory leak; and
   storing, as stored data, the future status in a storage device.

2. The computer implemented method of claim 1 further comprising:
   determining whether the memory leak exists.

3. The computer implemented method of claim 1 further comprising:
   using the software bundle to identify the memory leak based on a memory usage pattern, after determining that the memory leak exists.

4. The computer implemented method of claim 1 further comprising:
   presenting, to a user, a notification that the memory leak exists; and
   presenting, to the user, the stored data.

5. The computer implemented method of claim 3 further comprising:
   stopping the memory leak.

6. The computer implemented method of claim 5, wherein stopping the memory leak comprises one of restarting an application which is a source of the memory leak and terminating the application.

7. The computer implemented method of claim 1 further comprising:
   wherein the software bundle operates in an open services gateway initiative environment.

8. The computer implemented method of claim 1 further comprising:
   creating the memory leak having known parameters and using the created memory leak to validate the analysis to predict a future status of the memory leak by a validation bundle.

9. The computer implemented method of claim 1 further comprising:
   taking an action, based on the stored data, to reduce performance degradation of a data processing system, wherein the performance degradation is caused by the memory leak.

10. The computer implemented method of claim 9, wherein the performance degradation comprises at least one of a failure of the data processing system, a reduction in processing power of the data processing system, and a reduction in memory available to the data processing system.

11. The computer implemented method of claim 9 wherein the action comprises isolating a cause of the memory leak, terminating the cause of the memory leak, restarting the cause of the memory leak, and restarting the data processing system.

12. A computer implemented method comprising:
   receiving, at a software bundle, a first set of data comprising first memory consumption data, wherein the first set of data is received at a first time and wherein the software bundle is operating in an open services gateway initiative environment;
   receiving, at the software bundle, a second set of data comprising second memory consumption data, wherein the second set of data is received at a second time;
   responsive to a determination that a memory leak exists, comparing the first set of data and the second set of data to predict a future status of the memory leak; and
   storing, as stored data, the future status in a memory.

13. The computer implemented method of claim 12 further comprising:
   responsive to a notification condition being satisfied, presenting a notification that the memory leak exists to a user and presenting the stored data to the user.

14. The computer implemented method of claim 12 further comprising:
   responsive to a determination that either the memory leak is absent or that the notification condition is unsatisfied, waiting a time period before receiving the second set of data.

15. The computer implemented method of claim 12 further comprising:
   waiting a time period before receiving a third set of data comprising third memory consumption data.

16. The computer implemented method of claim 15 further comprising:
   receiving the third set of data;
   responsive to a determination that the memory leak exists, comparing the first set of data, the second set of data, and the third set of data to predict a second future status of the memory leak; and
   storing, as second stored data, the second future status in a memory.

17. The computer implemented method of claim 15 further comprising:
   responsive to a notification condition being satisfied, presenting a notification to a user that the memory leak exists and presenting to the user at least one of the stored data and the second stored data.

18. The computer implemented method of claim 12 further comprising:
   taking an action, based on the stored data, to reduce performance degradation of a data processing system, wherein the performance degradation is caused by the memory leak, wherein the action is taken at a particular time, and wherein the particular time is selected based on the stored data.

19. A computer program product comprising:
   a computer usable storage medium having computer usable program code for determining a future status of a memory leak, said computer program product including:
   computer usable program code for receiving, at a software bundle, a first set of data comprising memory consumption data;
   computer usable program code for, responsive to a determination that the memory leak exists, analyzing the first set of data to predict the future status of the memory leak; and
   computer usable program code for storing, as stored data, the future status in a storage device.

20. A data processing system comprising:
   a bus;
   a processor connected to the bus;
   a memory connected to the bus, wherein the memory contains computer usable instructions, and wherein the processor is adapted to execute the computer usable instructions to:
   receive, at a software bundle, a first set of data comprising memory consumption data;
   responsive to a determination that a memory leak exists, analyze the first set of data to predict a future status of the memory leak; and
   store, as stored data, the future status in a storage device.

* * * * *